Figure 4:
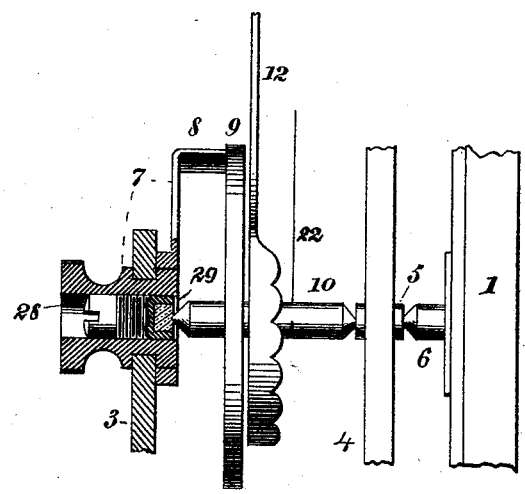

(No Model.)  2 Sheets—Sheet 1.
E. WESTON.
ELECTRICAL MEASURING INSTRUMENT.
No. 480,897.  Patented Aug. 16, 1892.
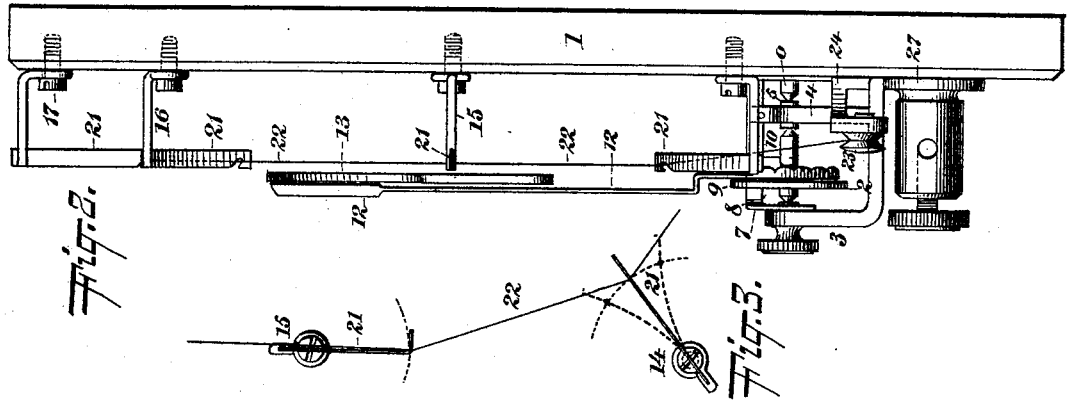
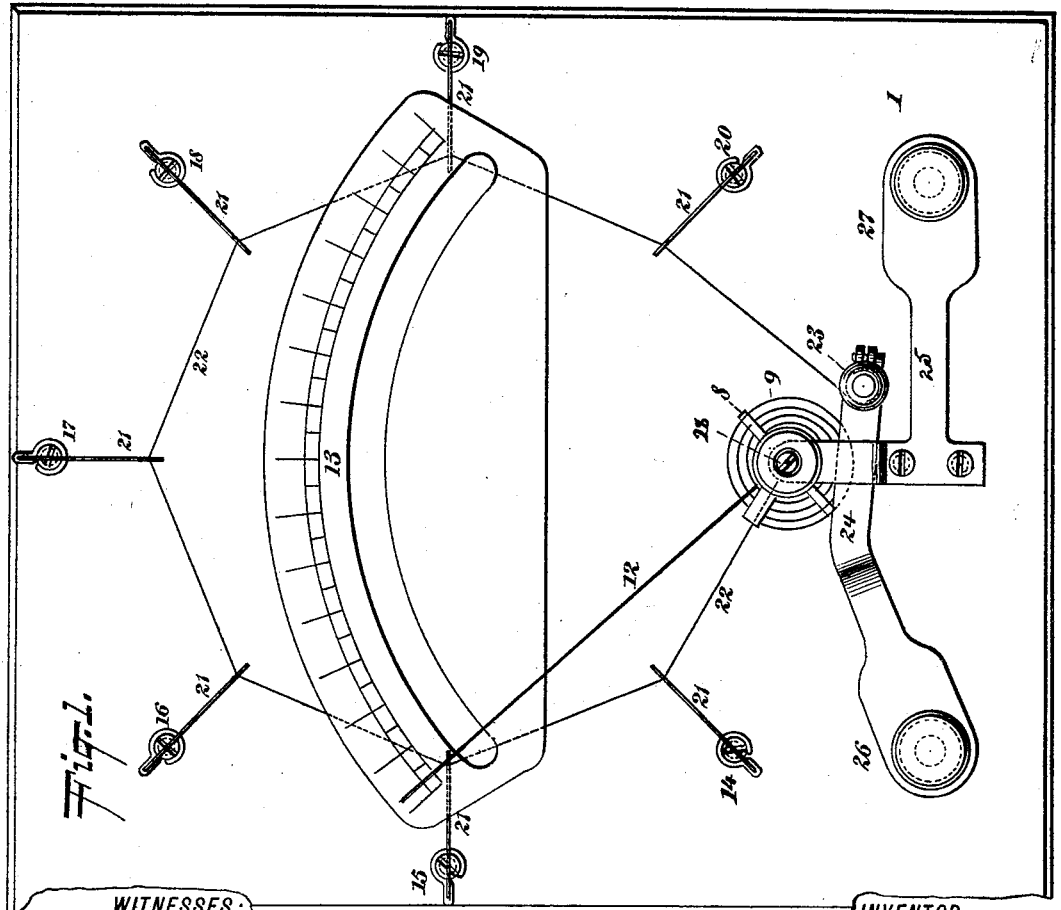
WITNESSES:
Gustave Dieterich.
H. R. Roller
INVENTOR
Edward Weston
BY Park Benjamin
his ATTORNEY.

(No Model.)
2 Sheets—Sheet 2.

E. WESTON.
ELECTRICAL MEASURING INSTRUMENT.

No. 480,897. Patented Aug. 16, 1892.

WITNESSES:

INVENTOR
Edward Weston
BY Park Benjamin
his ATTORNEY.

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 480,897, dated August 16, 1892.

Application filed January 14, 1892. Serial No. 418,101. (No model.)

*To all whom it may concern:*

Be it known that I, EDWARD WESTON, of Newark, Essex county, New Jersey, have invented a new and useful Improvement in Electrical Measuring-Instruments, of which the following is a specification.

My invention relates to an instrument for the measurement of current strength or pressure. It depends upon the principle that a wire when heated by a current passing through it will expand and that the extent of expansion or elongation bears a relation to the current strength or pressure.

My invention consists in an entirely novel construction and arrangement of an instrument embodying the foregoing principle, in which I am enabled to use a shorter and thinner wire than has hitherto been employed, to do away with the disturbing effects of tension on the wire and frictional resistance to its expansion, to greatly improve the portability of the apparatus, and to render it operative with far less current than has hitherto been employed, and hence at a much reduced expense.

In the accompanying drawings, Figure 1 is a plan view. Fig. 2 is a side elevation. Fig. 3 shows a modification in the mode of arranging the spring-supports for the wire, and Fig. 4 is a detailed view of the support for the shaft 10.

Similar numbers of reference indicate like parts.

1 is the base of the instrument. 2 is a bracket thereon having arms 3 and 4. The inner arm 4 receives a step 5, which rests upon the fixed pin 6. In the upper arm 3 is a thumb-nut 7, which carries a bent arm 8. To the end of arm 8 is connected one end of the spiral spring 9. The other end of said spring is connected to an arbor or spindle 10, which is pivoted in the step 5 and also in the step 11, which is held in the thumb-nut 7. By turning the thumb-nut 7 the spring 9 may be tightened or loosened, as desired, and the torque of the spindle or arbor 10 thus modified, as desired. The arbor 10 carries an index-needle 12, which extends over the scale 13, which is supported on the base 1.

Disposed around the circumference of a circle described on the base 1 is a number of arms or posts, as 14 15 16 17 18 19 20, each carrying a spring-arm 21. The arms 21 are notched near their ends to receive the thin wire 22. One end of the wire 22 is fastened to the arbor 10, and after it has passed through the notches in the arms 21 its other end is attached to a fixed stud 23 upon a plate 24, which is fastened to the base 1. A similar plate 25 also connects with the bracket 2. On the plates 24 and 25 are binding-posts 26 27, as shown. The spring 9, tending to rotate the arbor 10, normally keeps the wire 22 under slight tension, which can be regulated by suitably adjusting the arm 8.

Referring now more particularly to Fig. 4, it will be seen that the thumb-nut 7 has within it a screw-plug 28, on the lower part of which is a jewel 29, which receives the end of the shaft or arbor 10. The other end of the arbor 10 is received in a similar jewel in the step 5. The circuit therefore in detail proceeds from the binding-post 27 to the bracket-arm 3, and thence to the bent arm 8, which is received upon the thumb-nut 7, thence to the spiral spring 9, to arbor 10, and so to wire 22, and thence to stud 23, bracket 24, and binding-post 26. It will be noticed that the jewels insulate the ends of shaft 10 and that the same spring 9 which opposes the movement of said shaft leads the current to the expansible wire 22. When the current passes through the wire 22, the wire, becoming heated, expands. The strain of the wire upon the arbor 10 is thus relaxed and the spring 9 operates to turn said arbor over a distance which is determined by the amount of elongation of the wire. As in accordance with well-known laws the elongation of the wire depends upon the temperature to which it is raised, and as this temperature in turn depends upon the strength of the current traversing the wire it follows by observing the extent of movement of the index over the scale I have here a simple and accurate means of electrical measurement. The springs 21, it is to be noted, are practically frictionless supports, since the wire does not render through the notches, but in lieu thereof there is a slight swing of the springs, as indicated in dotted lines at the lower part of Fig. 3. In the arrangement of spring 21 shown at the lower part of Fig. 3 the tendency of the arm is to move outward from the polygon formed by the wire when the latter expands. At the upper part of Fig. 3 I show the spring-arm 21 placed differently and so arranged that when the wire elongates the arm will tend to move inwardly, thus reducing the periphery of the polygon instead of, as in the former case, increasing it. In lieu of a single wire 22 I may use two or more of such wires supported in like manner upon the spring-arms, and in this way I may increase the sensitiveness of the instrument.

I am well aware that electrical measuring-instruments have hitherto been made which contain wire to be heated by the current, and so caused to expand, and the best-known apparatus of that type is open to the following objections:

First. It is very long in shape, lacks portability, and requires about twelve feet of wire, or four lengths each of three feet.

Second. Its construction is expensive, owing to the fact that multiplying-gear is employed.

Third. The wire is looped over rollers, which make friction, and considerable tension is required to maintain it at its original length. I have found simple extension of the wire to alter the instrument reading four volts, and in all cases the wire is reduced in diameter and the needle thrown off the zero-line.

Fourth. The tension necessary to overcome the friction prevents the use of thin wire. Hence it requires a strength of current of upward of .3 ampère to operate the instrument. At a pressure of one hundred and ten volts the energy required is about one-twentieth horse-power, so that the apparatus is expensive to use.

In my instrument I have reduced the length of wire to about what is shown in the drawings, which represent a full-sized working apparatus. The improved portability of the device is obvious. Its construction is cheap and simple and it has no multiplying-gear at all. Its wire rests, as I have stated, on frictionless supports (which are very light and may be as light as the wire itself) and it is under no tension other than such as the spring exerts, and that, being no more than is necessary to take up the slack as the wire expands, is practically inconsiderable in its physical effect on the wire. I can make my wire one one-thousandth of an inch in diameter and even less. The usual diameter of wire in expansion voltmeters is three and one-half one-thousandths of an inch. Therefore the last-named apparatus requires over nine times as much current as mine does.

I may make the base 1 of metal and of such form and dimensions that its expansion due to atmospheric changes shall correspond to that of the wire, and thus render the instrument independent of such variation.

I claim—

1. In an electrical measuring-instrument, a flexible expansible body in open-loop form extending between abutments and two or more flexible and practically frictionless supports sustaining said body, the said supports permitting of the longitudinal movement of said body due to variations in the length thereof.

2. In an electrical measuring-instrument, a flexible expansible body in open-loop form extending between abutments, one of said abutments being fixed and the other adjustable, and two or more flexible and practically frictionless supports sustaining said body, the said supports permitting of the longitudinal movement of said body due to variations in the length thereof.

3. In an electrical measuring-instrument operated by the expansion or contraction of an elongated conducting-body in circuit and extending between abutments, a spring-arm supporting said body at its free extremity.

4. In an electrical measuring-instrument, a fine wire or filament in open-loop form and in circuit and having its extremities connected to abutments and two or more elastic frictionless supports vibrating in substantially the same plane as and sustaining said loop.

5. In an electrical measuring-instrument, two or more spring-arms extending from fixed supports and capable of vibrating in substantially the same plane and a fine wire or filament of conducting material received by the free ends of said springs and connected at its extremities to abutments.

6. In an electrical measuring-instrument, a flexible expansible body in substantially circular form and extending between abutments and a series of radially-projecting, flexible, and practically frictionless supports sustaining said body, the said supports permitting of the longitudinal movement of said body due to the variation in the length thereof.

7. In an electrical measuring-instrument, a shaft, a means for rotating said shaft, a fine filament or wire in loop form connected at one end to said shaft and at the other end to an abutment, and an elastic support for said loop yielding to the expansion of said wire.

8. In an electrical measuring-instrument, a shaft, an index or pointer on said shaft, a scale over which said index moves, a means for rotating said shaft, a fine filament or wire in loop form connected at one end to said shaft and at the other end to an abutment, and an elastic support for said loop yielding to the expansion of said wire.

9. In an electrical measuring-instrument, a shaft, a spring connected to said shaft and to an abutment and normally tending to rotate said shaft, a fine filament or wire in loop form connected at one end to said shaft and at the other end to an abutment, and an elastic support for said loop yielding to the expansion of said wire.

10. In an electrical measuring-instrument, a shaft, a spring connected to said shaft and to an abutment and normally tending to rotate said shaft, a fine filament or wire in loop form connected at one end to said shaft and at the other end to an abutment, an elastic support for said loop yielding to the expansion of said wire, and circuit connections whereby said spring and said filament are connected in circuit.

11. In an electrical measuring-instrument, a shaft, supports of insulating material in which said shaft is pivoted, an adjustable coiled spring of conducting material connected at one end to said shaft and at the other end to an abutment and normally tending to rotate said shaft, a fine filament or wire in loop form connected at one end to said shaft and at the other end to an abutment, an elastic support for said loop yielding to the expansion of said wire, and circuit connections whereby said spring and said filament are connected in circuit.

12. In an electrical measuring-instrument, a series of fixed supports disposed around the circumference of a circle, a spring-arm carried by each of said supports and extending in the direction of a radius of said circumference toward the center thereof, a shaft, a means for rotating said shaft, and a fine filament or wire connected to said shaft and to an abutment and supported by said springs.

13. In an electrical measuring-instrument, the combination of the base 1, bracket 2, shaft 10, supported by said bracket, spring 9, connected at one end to said shaft and at the other end to an abutment and normally tending to rotate said shaft, the fine filament or wire 22, connected at one end to said shaft and at the other end to an abutment 23 and in loop form, and a series of spring-supports 21, arranged upon said base and receiving the loop of said wire.

14. In an electrical measuring-instrument, the combination of the base 1, fixed supports 15 16, &c., disposed thereon, leaf-springs 21, carried by said supports, bracket 2, shaft 10, supported by said bracket, spring 9, connected at one end to said shaft, adjusting-arm 8, to which the other end of said spring is fastened, a fixed abutment 23, and a fine filament or wire 22, connected at its extremities to said shaft and said abutment and supported by said leaf-springs 21.

EDWARD WESTON.

Witnesses:
R. C. FESSENDEN,
H. R. MOLLER.